United States Patent Office 3,755,409
Patented Aug. 28, 1973

3,755,409
PREPARATION OF AROMATIC NITRILES BY REACTION OF AROMATIC HALIDES WITH METAL CYANATES AND CARBON MONOXIDE IN THE PRESENCE OF NICKEL OR PALLADIUM CATALYSTS
John F. Harris, Jr., Wilmington, Del., assignor to E. I. du Pont de Nemours and Company, Wilmington, Del.
No Drawing. Filed Oct. 8, 1970, Ser. No. 79,347
Int. Cl. C07c 121/02
U.S. Cl. 260—465 R
12 Claims

ABSTRACT OF THE DISCLOSURE

One or two nitrile groups can be introduced onto aromatic (carbocyclic) rings by reaction between halogenated aromatic compounds (other than fluorinated), carbon monoxide and a metal cyanate in the presence of a nickel- or palladium-containing catalyst. For example, benzonitrile can be prepared from chlorobenzene, sodium cyanate and carbon monoxide in the presence of a nickel salt.

BACKGROUND OF THE INVENTION

(1) Field of the invention

This invention relates to the preparation of aromatic nitriles, e.g., benzonitrile, by the reaction of aromatic halides with metal cyanates and carbon monoxide in the presence of certain transition metal catalysts, particularly nickel salts.

(2) Prior art

No disclosure of the subject process in the prior art is known.

THE INVENTION

As noted above, the present invention is a process for the preparation of nitriles by the reaction of aromatic halides (chlorides, bromides or iodides) with metal cyanates and carbon monoxide in the presence of certain catalysts (nickel- or palladium-containing compositions). An equation for the reaction can be written as follows:

$$RX_n + nCO + nMeCNO \rightarrow R(CN)_n + nMeX + nCO_2$$

where R is an aromatic group (defined more specifically below), X is chlorine, bromine or iodine, $n=1$ or 2 and Me is any metal. R is a carbocyclic, including polycyclic, aromatic group of 6 to 14 carbon atoms in the ring system. R may also contain substituents other than X such as alkyl, aryl, fluorine, fluoroalkyl, alkoxy, aryloxy, carboxyl or alkoxycarbonyl. Preferably, R may contain up to three substituents (other than X) which, alike or different, may be hydrocarbon alkyl of 1–18 (most preferably 1–8) carbons, hydrocarbon aryl of 6–10 carbons, fluoroalkyl of 1–8 carbons, lower hydrocarbon alkoxy of 1–8 carbons, hydrocarbon aryloxy of 6–10 carbons, or hydrocarbon lower alkoxycarbonyl of 2–9 carbons.

The reaction of carbon monoxide and the metal cyanate with the haloaromatic reactant is accomplished by contacting the reactants in a closed reactor at a temperature in the range of about 100° C. to about 400° C. and a partial pressure of carbon monoxide in the range of a few atmospheres to about 5000 atmospheres.

The aromatic halide reactants of the process of the invention are compounds of the formula $$RX_n$$

in which R, X and $n$ have the foregoing definitions. As noted, the R group of the haloaromatic reactants may also contain other named substituents, but in fact, any other substituent may be present as long as it does not interfere with the reaction by which the halide group is replaced by the nitrile group. Certain substituents may even undergo reaction with carbon monoxide under the conditions of the process, e.g., the reaction of a nitro group to form an isocyanate, but this need not prevent the conversion of the holgen group to the cyano group. Operable aromatic halides include chlorobenzene, bromobenzene, iodobenzene, p-dichlorobenzene, m-dibromobenzene, o-dichlorobenzene, 1-bromo-4-iodobenzene, 1-chloronaphthalene, 2-bromonaphthalene, 1,4-dibromonaphthalene, 9,10-dichloroanthracene, 3-chlorophenanthrene, p-bromotoluene, 1-bromo-2-fluorobenzene, p-chloroanisole, p-iodobenzoic acid, methyl-p-chlorobenzoate, 4,4'-dichlorodiphenyl, (4-chlorophenoxy)benzene, etc.

The carbon monoxide reactant is generally introduced into the reaction system from a reservoir initially and as needed during the process, though if desired it may be loaded under a sufficiently high initial pressure at the start and thereafter not replenished. At least enough carbon monoxide is used for the reaction to go to completion, but it is preferred to use it in considerable excess so that its partial pressure remains high throughout the reaction.

The cyanate moiety of the metal cyanate is considered the critical entity of this reactant, since it appears that any metal cyanate is operable in the process. Accordingly, Me in the formula MeCNO represents any metallic element. An alkali metal cyanate is preferred, and sodium or potassium cyanate is most preferred. The cyanate is used in about an equivalent proportion to the reactive halogen in the haloaromatic reactant. It may be used in greater proportion if desired, but in order to insure maximum conversion of the halogen group it is usually used in at least equivalent proportion.

The catalyst for the reaction can be any nickel or palladium compound, e.g., a nickel or palladium salt or complex such as nickel acetate or palladium chloride, or an active form of metallic nickel or palladium, e.g., finely divided nickel supported an kieselguhr or finely divided palladium supported on carbon. It will be understood that, although they provide no particular advantage, a plurality of catalysts can be used as well as one. Several catalysts may, indeed, often be present, particularly as reduction or decomposition products of a catalyst initially employed. Nickel and palladium compositions may also be used simultaneously. A list of individual usable catalysts is in the table.

TABLE

| A. Metallic nickel and palladium on supports | |
|---|---|
| Formula | Name |
| Ni/C | Nickel on carbon. |
| Ni/kieselguhr | Nickel on kieselguhr. |
| Ni/SiO₂ | Nickel on silica. |
| Ni/Al₂O₃ | Nickel on alumina. |
| Pd/C | Palladium on carbon. |
| Pd/BaSO₄ | Palladium on barium sulfate. |
| Pd/SiO₂ | Palladium on silica. |

| B. Inorganic nickel and palladium compounds | |
|---|---|
| Ni(NO₃)₂ | Nickel(II) nitrate. |
| NiSO₄ | Nickel(II) sulfate. |
| NiCl₂ | Nickel(II) chloride. |
| NiBr₂ | Nickel(II) bromide. |
| Ni(BF₄)₂ | Nickel(II) tetrafluoroborate. |
| Ni(BO₂)₂·xH₂O | Nickel(II) metaborate hydrate. |
| Ni(ClO₄)₂·6H₂O | Nickel(II) perchlorate hexahydrate. |
| Ni(CO)₄ | Tetracarbonylnickel(O). |
| PdCl₂ | Palladium(II) chloride. |
| PdO | Palladium(II) monoxide. |
| Pd(NO₃)₂ | Palladium(II) nitrate. |
| Na₂PdCl₄ | Sodium-palladium(II) tetrachloride. |
| (NH₄)₂PdCl₆ | Ammonium-palladium(IV) hexachloride. |
| (NH₃)₂PdCl₂ | Dichlorodiaminepalladium(II). |
| (NH₃)₄PdCl₂ | Dichlorotetra-aminepalladium (II). |

TABLE—Continued

C. Organo-nickel and -palladium compounds [1]

| | |
|---|---|
| $Ni(O_2CCH_3)_2 \cdot 4H_2O$ | Nickel(II) acetate tetrahydrate. |
| $Ni(O_2CC_3H_7)_2$ | Nickel(II) butyrate. |
| $Ni(C_5H_7O_2)_2$ | Nickel(II) acetylacetonate. |
| $NiBr_2 \cdot (CH_2OCH_3)_2$ | Nickel(II) bromide-(1,2-dimethoxyethane). |
| $[(C_6H_5)_3P]_2Ni(CN)_2$ | Dicyanobis(triphenylphosphine) nickel(II). |
| $(C_5H_5NiCO)_2$ | Dicarbonylbis(cyclopentadienyl) dinickel. |
| $[(C_6H_5)_3P]_2Ni(CO)_2$ | Dicarbonylbis(triphenylphosphine)nickel(O). |
| $(C_6H_5)_3P]_2NiCl_2$ | Dichlorobis(triphenylphosphine) nickel(II). |
| $[(C_6H_5)_3P]_2\text{-}Ni[CH_2=CHCN]$ | Acrylonitrilebis(triphenylphosphine)-nickel(O). |
| $(o\text{-}CH_3C_6H_4)Ni\text{-}[C_6H_5(C_2H_5)_2P]_2Br$ | Bromobis[(diethyl)phenylphosphine]-(o-tolyl)nickel(II). |
| $(C_6H_5)_2Ni\text{-}[(C_2H_5)_3P]_2$ | Diphenylbis(triethylphosphine)-nickel(II). |
| $C_5H_5NiNO$ | Cyclopentadienylnitrosonickel. |
| $(CH_2=CHCN)_2Ni$ | Bis(acrylonitrile)-nickel(O). |
| $[(C_6H_5)_3P]_2Ni\text{-}(CH_2=CHCHO)_2$ | Bis(acrolein)bis(triphenylphosphine)-nickel(O). |
| $(CH_3N=C)Ni(CO)_3$ | Tricarbonyl(methyl isocyanide) nickel(O). |
| $(C_6H_5CH_2N=C)_4\text{-}Ni(CN)_2$ | Dicyanotetrakis(benzyl isocyanide)-nickel(II). |
| $[(C_6H_5)_2P(CH_2)_2\text{-}P(C_6H_5)_2]Ni(CO)_2$ | Dicarbonyl[1,2-bis(diphenylphosphino)-ethane]nickel(O). |
| $CH_3Pd[(C_2H_5)_3P]_2Br$ | Bromo(methyl)bis(triethylphosphine)-palladium(II). |
| $(C_6H_5C=C)_2Pd[(C_2H_5)_3P]_2$ | Bis(phenylethynyl)bis(triethylphosphine)palladium(II). |
| 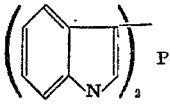 | Bis(2-indolyl)palladium(II) dihydrochloride. |
| $(C_3H_5)Pd(C_5H_5)$ | Allyl(cyclopentadienyl)palladium (II). |
| $[(C_2H_5)_4N]_2PdCl_4$ | Bis(tetraethylammonium)tetrachloropalladium(II). |
| $[(n\text{-}C_4H_9)_3P]_2PdBr_2$ | Dibromobis[tri(n-butyl)phosphine]-palladium(II). |
| $(C_3H_5)(PdCl)_2(CO)_2$ | Di-μ-chloro(allyl)dicarbonyl-dipalladium(II). |
| $(C_5H_5)PdNO$ | Cyclopentadienylnitrosopalladium. |
| $[(C_3H_5)PdCl]_2$ | Di-μ-chlorobis(allyl)dipalladium. |
| $[[(CH_3)_2C=CH_2]PdCl_2]_2$ | Di-μ-chlorodichlorobis(isobutylene)-dipalladium(II). |
| $(C_6H_5N=C)_2Pd$ | Bis(phenylisocyanide)palladium (O). |
| $[C_6H_5(CH_3)_2P]_2PdCl_2$ | Dichlorobis[phenyl(dimethyl) phosphine]palladium(II). |
| $(C_6H_5N=C)_2PdCl_2$ | Dichlorobis(phenyl isocyanide)-palladium(II). |

[1] These compounds are described in Dub, Organometallic Compounds, vol. 1, Springer-Verlag, New York, 1966.

The quantity of catalyst employed is not critical. Any of the nickel or palladium compositions is catalytically effective in molar proportions of nickel and/or palladium to reactive halogen to about 0.0001:1 or higher, preferably in the range of about 0.001:1 to 0.01:1.

The temperature at which the reaction can be carried out may be above 400° C., provided the particular haloaromatic reactant and the aromatic nitrile product are stable at such temperature. A temperature in the range of 150–350° C. is preferred.

The upper pressure involved in the process is not critical and can be above a carbon monoxide partial pressure of 5000 atmospheres, though little advantage is achieved by use of such pressures. An additional partial pressure of an inert material, either a solvent medium or a gas, may be present, but is not necessary or ordinarily used. A convenient and preferred parital pressure of carbon monoxide is in the range of about 500 to about 1000 atmospheres.

The products of the reaction of aromatic halides, carbon monoxide and metal cyanates are aromatic nitriles which can be represented by the formula $$R(CN)_n$$

in which R and n are as defined above. These products are liquids or solids, generally soluble in ordinary solvents such as ethers or halohydrocarbons, e.g., diethyl ether and chloroform. They can be separated by extraction from insoluble materials in the reaction mixtures, and can be purified by ordinary procedures of distillation or crystallization.

The products are generally useful as intermediates by well-known processes to corresponding carboxylic acids, carboamides and amines, which in turn have well-known utilities. For example, terephalonitrile is an intermediate for condensation polymers based on terephthalic acid, and benzonitrile is a generally useful reaction solvent. Benzoic acid, derivative from benzonitrile, is a well-known commercial chemical. The nitrile products are, like benzonitrile, also generally useful as solvents, at elevated temperature if they are normally solid.

EMBODIMENTS OF THE INVENTION

In the following examples illustrating the process of the invention, the amounts of liquid or solid materials are expressed in parts or percentages by weight, temperatures are given in degrees centigrade, reaction pressures are shown in gauge-measured atmospheres, and distillation pressures are absolute pressures expressed in millimeters of mercury. Analyses by gas chromatography which provide determinations of proportions expressed in percentages are based on thermal conductivity detection procedures, and the percentages are "area" values which are close approximations of percentages by weight (cf. Purnell, "Gas Chromatography," John Wiley & Sons, Inc., (1962), p. 285).

EXAMPLE 1

A mixture of 53.2 parts of chlorobenzene, 50 parts of sodium cyanate and 0.3 part of nickel(II) diacetate tetrahydrate was placed in a stainless steel autoclave. The autoclave was cooled to Dry Ice, evacuated and pressured with carbon monoxide. The reaction mixture was then heated at 350° C. for 4 hours, while the total pressure was maintained at 600 atmospheres by periodic addition of CO. After the autoclave was cooled and vented, the reaction mixture (a mixture of solid and liquid) was removed and diluted with 67 parts of dichloromethane. An analysis of the liquid portion of the reaction mixture by gas chromatography indicated a 79% conversion to benzonitrile. Distillation of the filtered reaction mixture gave 31.75 parts (65% yield based on the chlorobenzene charged) of a fraction boiling at 85° C./26 mm. An infrared spectrum confirmed that this material was benzonitrile.

EXAMPLE 2

A mixture of 75 parts of bromobenzene, 40 parts of potassium cyanate and 0.3 part of nickel(II) diacetate tetrahydrate was treated as described in Example 1. An analysis by gas chromatography of the liquid portion of the reaction mixture showed that all of the bromobenzene had been consumed, and the only product detected was benzonitrile.

EXAMPLE 3

A mixture of 91 parts of iodobenzene, 40 parts of potassium cyanate and 0.3 part of nickel (II) diacetate tetrahydrate was heated at 150° C. for 4 hours while pressured with CO to a total pressure of 600 atmospheres as described in Example 1. An analysis by gas chromatography indicated the presence of benzonitrile.

EXAMPLE 4

A mixture of 53.2 parts of chlorobenzene, 40 parts of sodium cyanate and 0.3 part of nickel(II) acetylacetonate was treated exactly as described in Example 1. An analysis by gas chromatography indicated a conversion to benzonitrile of 83%. Upon distillation of the filtered reaction mixture, there was obtained 24 parts (49% yield based upon the chlorobenzene charged) of benzonitrile, distilling at 70–77° C./20 mm.

EXAMPLE 5

A mixture of 75 parts of bromobenzene, 40 parts of potassium cyanate and 0.3 part of nickel (II) acetylacetonate was treated as described in Example 1 except that the temperature was 300° C. An analysis by gas chromatography indicated a conversion to benzonitrile of 87%. A distillation of the filtered reaction mixture yielded 20 parts (40% yield based on the bromobenzene charged) of benzonitrile distilling at 72° C./15 mm.

EXAMPLE 6

A mixture of 53.2 parts of chlorobenzene, 40 parts of potassium cyanate and 0.3 part of dicarbonylbis[ethyl-(diphenyl)phosphine]nickel(O) was heated at 350° C. for 4 hours, while pressured with CO at a total pressure of 600 atmospheres as described in Example 1. An analysis of the liquid portion of the reaction mixture by gas chromatography indicated a 12.3% conversion to benzonitrile.

EXAMPLE 7

A mixture of 53.2 parts of chlorobenzene, 40 parts of sodium cyanate and 2 parts of a catalyst composed of nickel supported on kieselguhr was heated at 350° C. for 4 hours, while pressured with CO to a total pressure of 600 atmospheres as described in Example 1. An analysis of the liquid portion of the reaction mixture indicated a 91.5% conversion of the chlorobenzene to a mixture of benzonitrile (94%) and benzene (6%). Distillation of the filtered reaction mixture through a small spinning band still yielded 23.72 parts (49.1% yield based upon the chlorobenzene charged) of benzonitrile distilling at 79° C./21 mm.

EXAMPLE 8

A mixture of 53.2 parts of chlorobenzene, 40 parts of sodium cyanate and 1.1 parts of 10% Pd/carbon was heated at 350° C. for 4 hours, while pressured with CO to a total pressure of 600 atmospheres as described in Example 1. An analysis by gas chromatography of the liquid portion of the reaction mixture indicated a 60% conversion of the chlorobenzene to benzonitrile. Distillation of the filtered reaction mixture through a small spinning band still gave 24.05 parts (49% yield based on the charged chlorobenzene) of benzonitrile distilling at 69–71.5° C./15 mm. An infrared spectrum confirmed that the product was benzonitrile.

EXAMPLE 9

A mixture of 75 parts of bromobenzene, 50 parts of potassium cyanate and 1.1 parts of 10% Pd/carbon was heated at 350° C. for 4 hours, while pressured with CO to a total pressure of 600 atmospheres as described in Example 1. An analysis by gas chromatography of the liquid portion of the reaction mixture indicated that virtually all of the bromobenzene had been consumed. The only product detected was benzonitrile. Distillation of the filtered reaction mixture through a small spinning band still gave 19.19 parts (39% yield based on the bromobenzene charged) of benzonitrile distilling at 69° C./15 mm. $n_D^{25}$, 1.5260.

EXAMPLE 10

A mixture of 90 parts of p-dibromobenzene, 68 parts of potassium cyanate and 2 parts of 10% Pd/carbon was heated at 350° C. for 4 hours, while pressured with CO to a total pressure of 600 atmospheres as described in Example 1. The resulting solid reaction mixture (132.25 parts) was extracted with 149 parts of chloroform. Evaporation of the extracts yielded 9.98 parts of solid, which after being stirred with water, filtered and dried, yielded 6.24 parts of solid material. An infrared spectrum indicated that this solid was largely terephthalonitrile containing a little p-bromobenzonitrile.

Since obvious modifications and equivalents will be evident to those skilled in the chemical arts, I propose to be bound solely by the appended claims.

What is claimed is:

1. The process of forming aromatic nitriles which comprises contacting and reacting together in the presence of a catalyst consisting essentially of at least one of nickel or palladium metals or a salt or organo-metal compound thereof,
carbon monoxide, a metal cyanate and an aromatic halide of the formula $$RX_n$$

wherein:

R is a carbocyclic aromatic group of 6 to 14 carbon atoms in the ring system carrying 0–3 substituents selected from the group consisting of alkyl of 1–8 carbons, aryl of 6–10 carbons, fluoroalkyl of 1–8 carbons, alkoxy of 1–8 carbons, aryloxy of 6–10 carbons and alkoxycarbonyl of 2–9 carbons;

X is chlorine, bromine or iodine; and $n$ is 1 or 2, at a temperature in ther ange of about 100° C. to 400° C. and a partial pressure of carbon monoxide of up to about 5000 atmospheres.

2. The process of claim 1 in which the catalyst is a nickel salt.

3. The process of claim 1 in which the catalyst is a organo nickel compound.

4. The process of claim 1 in which the catalyst is metallic nickel.

5. The process of claim 1 in which the catalyst is metallic palladium.

6. The process of claim 1 wherein benzonitrile is produced by reacting a halogenated benzene with carbon monoxide and an alkali metal cyanate in the presence of a nickel salt an organo-nickel compound or metallic ickel.

7. The process of claim 1 wherein benzonitrile is produced by reacting a halogenated benzene with carbon monooxide and an alkali metal cyanate in the presence of metallic palladium.

8. The process of claim 1 wherein a dicyanobenzene is produced by reacting a dihalogenated benzene with carbon monoxide and an alkali metal cyanate in the presence of a nickel salt an organo-nickel compound or metallic nickel or palladium.

9. The process of claim 8 wherein the dicyanobenzene is terephthalonitrile.

10. The process of claim 1 wherein benzonitrile is produced by reacting a halogenated benzene with carbon monoxide and an alkali metal cyanate in the presence of nickel (II) diacetate.

11. The process of claim 1 wherein benzonitrile is produced by reacting a halogenated benzene with carbon monoxide and an alkali metal cyanate in the presence of nickel (II) acetylacetonate.

12. The process of claim 1 wherein benzonitrile is produced by reacting a halogenated benzene with carbon monoxide and an alkali metal cyanate in the presence of dicarbonylbis[ethyl(diphenyl)phosphine]nickel[O].

References Cited

UNITED STATES PATENTS

| | | | |
|---|---|---|---|
| 3,576,836 | 4/1971 | Prichard | 260—453 |
| 3,475,480 | 10/1969 | Habibi | 260—465 |
| 2,866,801 | 12/1958 | Himel et al. | 260—453 |

LEWIS GOTTS, Primary Examiner

D. H. TORRENCE, Assistant Examiner

U.S. Cl. X.R.

260—465 D, 465 F, 465 G, 465 H

UNITED STATES PATENT OFFICE
CERTIFICATE OF CORRECTION

Patent No. 3,755,409  Dated August 28, 1973

Inventor(s) John F. Harris, Jr.

It is certified that error appears in the above-identified patent and that said Letters Patent are hereby corrected as shown below:

Column 2, line 5 - "hologen" should be "halogen".

Column 2, line 38 - "an" should be "on".

Column 4, line 32 - "to" should be "in".

Column 6, line 20, claim 1 - "ther ange" should be "the range".

Column 6, line 35, claim 6 - "ickel" should be "nickel".

Signed and sealed this 19th day of February 1974.

(SEAL)
Attest:

EDWARD M. FLETCHER, JR.
Attesting Officer

C. MARSHALL DANN
Commissioner of Patents